United States Patent Office 3,600,385
Patented Aug. 17, 1971

3,600,385
BIS-(TRIAZINYLAMINO) STILBENE DERIVATIVES
FOR OPTICAL BRIGHTENING
Frank Fred Loffelman, Middlesex, and Leroy Michael
Konzelman, Livingston, N.J., assignors to American
Cyanamid Company, Stamford, Conn.
No Drawing. Filed Dec. 16, 1968, Ser. No. 784,250
Int. Cl. C07d 55/22
U.S. Cl. 260—240
7 Claims

ABSTRACT OF THE DISCLOSURE

A new class of ditriazinyl derivatives is provided which are particularly useful as optical brighteners for cellulosics. The compounds are the bis-(triazinylamino)stilbenes represented by the following general formula:

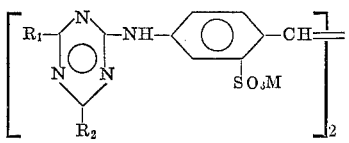

wherein $R_1$ is the residue of a 3-[(mono- or dihydroxyalkyl)amino]propionamide in which the 3-amino nitrogen is attached to the triazine nucleus; $R_2$ is a member selected from the group consisting of lower alkoxy, arylamino and the residue of a 3-[(mono- or dihydroxyalkyl)amino]propionamide in which the 3-amino nitrogen is attached to the triazine nucleus; and M is a cation selected from the group consisting of hydrogen, sodium, potassium, lithium, ammonium, and substituted ammonium. A novel and useful class of aliphatic amine intermediates is also disclosed.

---

This invention relates to a novel and useful class of ditriazinyl derivatives of 4,4'-diaminostilbene-2,2'-disulfonic acid. More particularly, the invention relates to the bis-(triazinylamino)stilbenes which find a particular utility as optical brighteners for cellulosics.

With the advent of improved textile and paper finishing agents and detergents, as well as the conditions imposed by many of the new manufacturing procedures, the conventional optical brighteners for cellulosics have been found wanting. Thus, particular standards of performance for such brighteners have evolved which require stability in the presence of detergents, and cationic softening agents, an affinity for resin-treated cellulosics, efficiency in cold-water washing and improved solubility.

It is the primary object of the present invention to provide a new class of cellulosic brightening agents which possess stability (including color stability) in the presence of detergents and cationic softening agents, and which exhibit excellent affinity in cold-water washing, for cellulosics, including resin-treated cellulosics.

Additional objects and advantages of the invention will be apparent from the following description thereof.

The new brightening compounds of the invention are bis(triazinylamino)-stilbenes of the following formula:

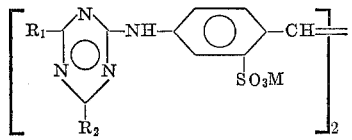

wherein:

$R_1$ is the residue of a 3-[(mono- or dihydroxyalkyl)amino]propionamide, the 3-amino nitrogen of which is attached to the triazine nucleus;

$R_2$ is a member selected from the group consisting of lower alkoxy, arylamino and the residue of a 3-[(mono- or dihydroxyalkyl)amino]propionamide, the 3-amino nitrogen of which is attached to the triazine nucleus; and M is a cation selected from the group consisting of hydrogen, sodium, potassium, lithium, ammonium and substituted ammonium, e.g., mono- or di-ethanol ammonium.

The invention also provides a new class of aliphatic amines which are utilized as intermediates in preparing the new brighteners. These amines are derived from unsaturated aliphatic amides and have the following general formula:

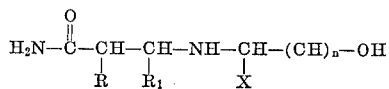

wherein:

R is a member selected from the group consisting of hydrogen, methyl, ethyl and halogen;

$R_1$ is a member selected from the group consisting of hydrogen, lower alkyl, halogen and phenyl;

X is selected from the group consisting of hydrogen, methyl, ethyl and —$CH_2OH$;

Y is selected from the group consisting of hydrogen, methyl, ethyl and —$CH_2OH$; and $n$ is an integer of from 1 to 3.

The new brighteners of the invention meet all of the requirements for optical brighteners hereinabove mentioned. Thus, they can be utilized for brightening paper by tub size application or beater dyeing. Also, they can be padded on cotton from an aqueous medium, or formulated with detergents, thereby rendering a brightening effect on cellulosic fabrics in laundering.

The novel brightener compounds of the invention are prepared by reacting one mole of disodium, dipotassium or dilithium salt of 4,4'-diaminostilbene-2,2'-disulfonic acid in an aqueous medium with two moles of either cyanuric chloride or the reaction product of cyanuric chloride with an alcohol, such as methyl, ethyl, normal or isopropyl or normal or isobutyl alcohols, to form disodium 4,4'-di-(4,6-dichloro-s-triazin-2-ylamino)stilbene-2,2'-disulfonate which is then reacted with two moles of an arylamine, such as aniline, p-chloroaniline, metanilic acid, sulfanilic acid, or 3- or 4-aminobiphenyl, at pH 4-7 and a temperature of 5-20° C. The resulting product, designated Product I in the following reaction scheme, is treated with a substituted 3-aminopropionamide. This reaction is carried out in an aqueous medium at pH 8 to 10 and at temperatures from 65° C. to reflux. In the reaction scheme, $R_2$ is defined as a member selected from the group consisting of lower alkoxy, arylamino and the residue of a 3 - [(mono- or dihydroxyalkyl)amino]propionamide in which the 3-amino nitrogen is attached to the triazine nucleus, $n$ is an integer from 1 to 2, and alkyl is a normal or branch-chained alkyl of two to four carbon atoms.

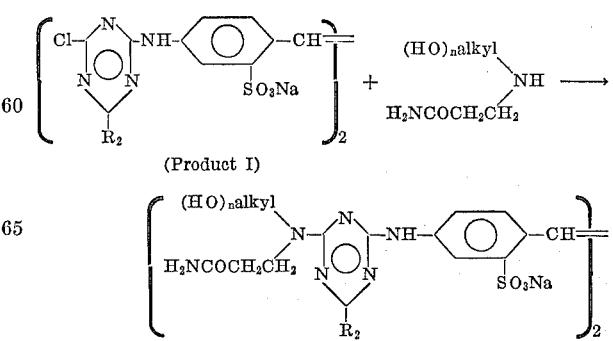

The final reaction mixture may be directly formulated for use in commerce without isolating the brightener product, or the product may be salted out of the aqueous reaction mixture and dried, or the reaction mixture may be spray-dried. It may be desalted, if need be, by dissolving in dimethylformamide and precipitating with isopropanol, or by extended washing with alcohol/water mixtures.

The novel aliphatic amine intermediates of the invention can be prepared by a conventional synthesis involving the addition of an amine to an unsaturated amide. The reaction is ordinarily conducted via the stepwise addition of the amide to an alcoholic solution of the amine at or near room temperature. Generally it is desirable to employ an excess of the amine of up to about 100%, however, in cases where the amine is not readily volatile, smaller excesses may be used. Although ethanol is commonly used as the solvent, it is not critical to the synthesis, and any of the lower aliphatic alcohols may be used, or inert solvents, such as tetrahydrofuran or dioxane.

The reaction mixture is usually agitated for up to about 24 hours at temperatures of about 20 to 30° C. and the product obtained by evaporation of the solvent and any excess amine in vacuo. The products are very hygroscopic.

Unsaturated aliphatic amides which may be used in the reaction include, for example: acrylamide, methacrylamide; crotonamide; 2 - methylcrotonamide; 3 - methylcrotonamide; 2 - ethylcrotonamide; alpha-chloroacrylamide; beta-chloroacrylamide and alpha, beta-dichloroacrylamide.

Amines useful in the synthesis include: ethanolamine; n-propanolamine; isopropanolamine; glycolamine; 2-aminobutanol; 3-aminobutanol; diglycolamine; bis(2-hydroxyethyl)amino propylamine; bis(2 - hydroxyethyl) amino ethylamine; 1 - hydroxymethylpropolyamine and N,N-dihydroxyethyl-1,3-diaminopropane.

Typical of the novel aliphatic amine intermediates are the following:

3-(2-hydroxyethylamino)propionamide
3-[(1-hydroxypropyl)amino]propionamide
3-[(2-hydroxypropyl)amino]propionamide
3-[(3-hydroxypropyl)amino]propionamide
3-(4-hydroxybutylamino)propionamide
3-{[1-hydroxymethyl)propyl]amino}propionamide
3-{{3-[bis(2-hydroxyethyl)amino]propyl}amino}propionamide
3-{bis{[2-(hydroxymethyl)carbamoyl]ethyl}amino}propionamide
3-(3,4-dihydroxybutylamino)propionamide
3-(2,4-dihydroxybutylamino)propionamide
3-{[2-(2-hydroxyethoxy)ethyl]amino}propionamide
3-(2-hydroxyethylamino)-2-methylpropionamide
3-(2,3-dihydroxypropylamino)propionamide
3-(2-hydroxyethylamino)-3-phenylpropionamide Such propionamides lead to bis-(triazinylamino)stilbene compounds which are much stronger brighteners than corresponding propionitrile brighteners.

As shown hereinafter, the compounds of the invention are outstandingly effective as brighteners for cellulosics in both the detergent and paper fields. Thus, they possess excellent solubility properties and superiority to known brighteners of the bis-(triazinylamino)stilbene disulfonate class in buildup, stability to discoloration in detergents, cold water detergency strength, and cationic softener application. Also, they find utility in the paper field since they can be employed in both tub sizing and beater dyeing. In tub sizing they maintain their strength and are non-yellowing at the lower pH levels which are occasioned by the presence of excess alum in the finished sheet. The compound also demonstrates a strong affinity for cotton and a comparatively good affinity for resin treated cotton.

A more complete understanding of the invention will be had from the following illustrative examples.

EXAMPLE I

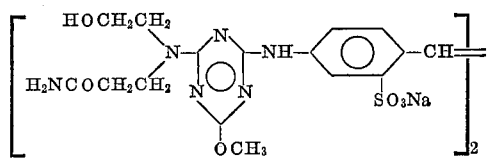

A mixture of 3.6 g. (0.005 mole) of disodium 4,4'-bis-[(4 - chloro - 6 - methoxy-s-triazin-2-yl)amino] - 2,2'-stilbenedisulfonate, 1.6 g. (0.012 mole) of 3-(2-hydroxyethylamino)propionamide, 0.9 g. of sodium bicarbonate and 40 ml. of water is gradually brought to reflux. The resultant solution is heated at reflux for four hours, cooled and filtered.

The product is then dissolved in 200 ml. 2% sodium chloride solution, concentrated to 100 ml. in volume, cooled, filtered and dried to give 4.2 g. of a product which has an absorptivity at 345 monometers of 48.2. This is raised to 58.2 by dissolving in 50 ml. dimethylformamide, adding 300 ml. isopropanol, filtering and washing with isopropanol and drying, to give 2.1 g. desalted product.

When 270 ml. 0.05% solution of the product is added to 230 ml. water, padded on 80 by 80 cotton, and air-dried at room temperature, the cotton fluoresced a reddish-blue shade under ultraviolet light. In north daylight the treated cotton is much whiter than untreated cotton.

Cotton is also whitened when laundered in 0.5% detergent solution containing 0.0025% brightener product at 130° F. The detergent can be nonionic or anionic in nature.

Paper coated by tub sizing (method described in Example III below) is also whitened.

EXAMPLE II

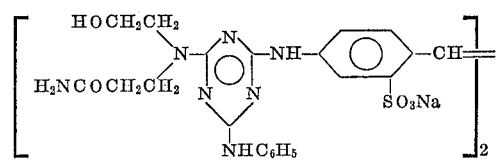

A mixture of 8.2 g. (0.01 mole) disodium 4,4'-bis[(4-anilino - 6 - chloro-s-triazin-2-yl)amino]-2,2'-stilbenedisulfonate, 8.0 g. (0.06 mole) of 3-(2-hydroxyethylamino)propionamide, and 90 ml. of water is heated at about 70° C. for one hour and the resultant solution is then heated at reflux for three hours. The solution is then salted with 15 g. sodium chloride, cooled and the product is filtered and dried.

The above product is dissolved in a minimum amount of dimethylformamide, decolorized with charcoal, filtered, and reprecipitated with isopropanol. It is then filtered, washed with isopropanol and dried. This is repeated to give 6.7 g. of a product having an absorptivity at 350 nm. of 52.9.

The product brightens cotton and resin-treated cotton, when applied from an anionic or nonionic detergent bath, or with a cationic softener.

When applied to paper by beater dyeing as described below, it shows good whitening strength. It can be used without an electrolyte and thus finds use in tissue application.

Method of beater dyeing of high consistency alum-acidified paper pulp: To 4 g. of bleached sulfite paper pulp in 200 ml. water a weight of brightener product is added which is equivalent to 0.5% brightener standard on weight of the pulp, the brightener being dissolved in 15 to 25 ml. water. The mixture is stirred 15 minutes and 1.0 ml. of a 4% solution of light wood-rosin size is added. It is then stirred for 15 minutes and 3 ml. of a 4% solution of alum is added, and stirred for an additional 30 minutes. The pulp mixture is formed into a sheet on a Williams Mold using water adjusted to pH 4.5, pressed at 18 to 20 lb./sq. in. for 30 seconds dried on a drum dryer at 230 to 240° F. at 5 minutes, and, conditioned for at least 30 minutes at ambient humidity.

When observed in north daylight, the sheet is a clear and bright white compared to an untreated control paper which had a dull yellowish tint. Under ultraviolet light, the paper dyed with a brightener of this invention shows a high degree of reddish-blue fluorescence compared to little or no fluorescence of untreated paper.

EXAMPLE III

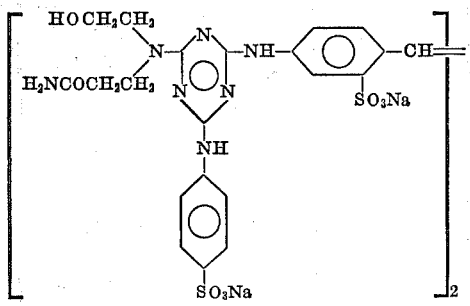

A mixture of 9.0 g. (0.0075 mole) of 86.3% real disodium 4,4'-bis[(4-chloro-6-sulfanilyl-s-triazin-2-yl)amino]-2,2'-stilbenedisulfonate, 6.0 g. (0.045 mole) of 3-(2-hydroxyethylamino)propionamide, and 60 ml. of water is heated at reflux for four hours. The mixture is then filtered with a filter aid, and salted to give, when filtered, dried and desalted in a manner similar to the preceding examples, 5.8 g. product having an adsorptivity at 350 nm. of 42.6.

Method of tub size application and comparison with known brightener: To 50 ml. of 12% starch solution is added a weight of the brightener prepared in this example to give a 0.1% solution. Similarly, a solution of a standard commercial brightener of the bis-(triazinylamino)stilbene disulfonate class (Example 1 of U.S. Pat. No. 3,132,106) in 50 ml. of 12% stock solution is prepared. Using these solutions, applications are then made to paper. The temperature is adjusted to 120° F. Unsized Mohawk off-set paper is then coated by uniform drawdown using a No. 12 wire-wound Equalizer Rod. The coated paper is dried at 200° F. for one minute and kept at constant humidity for one-half hour. The pH of the solution is near neutral.

The procedure is repeated with adjustment of the pH to 4.5 with alum.

Compared to an untreated control and with the paper treated with the commercial brightener, the paper coated as above with the brightener product of the present invention is whiter and brighter with a slightly reddish-blue tint. This is true in both instances where the application is made with no pH adjustment and where the application is made at the lower pH (i.e., 4.5). This demonstrates the superiority of the brightener of the invention in that uniformly desirable results are obtained even at low pH values.

EXAMPLE IV

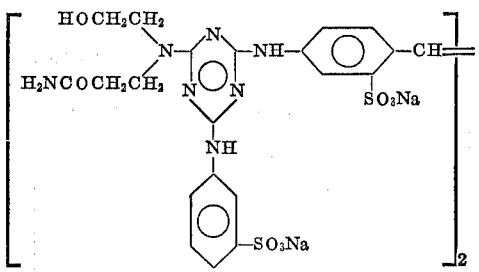

A mixture of 6.1 g. (0.005 mole) of 84.9% real disodium 4,4' - bis[(4-chloro-6-metanilyl-s-triazine-2-yl)amino]-2,2'-stilbenedisulfonate, 4.0 g. (0.03 mole) of 3-(2-hydroxyethylamino)propionamide, and 50 ml. of water is heated at reflux for four hours, filtered with a filter aid and the filtrate salted with 7 g. sodium chloride, cooled and filtered. The product is then recrystallized twice from 50 ml. 5% sodium chloride solution, filtered and dried. It is desalted by dissolving in dimethylformamide and precipitating with isopropanol, filtered and dried to give 2.5 g. of a product having an absorptivity at 350 nm. of 44.4.

The product whitens paper when coated by tub sizing and by beater dyeing of high consistency alum-acidified paper pulp.

EXAMPLE V

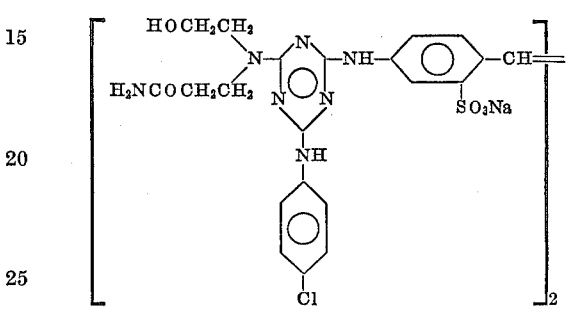

This example demonstrates the preparation of the p-chloroanilino analogue of the compound of Example II.

A slurry of 1.91 g. (0.005 mole) of disodium 4,4'-diaminostilbene-2,2'-disulfonate is heated to 60° C. while 2.0 ml. 5 N sodium hydroxide solution is added dropwise. The solution is clarified and 15 ml. of acetone is added and the solution is cooled to $-5°$ C. A chilled solution of 1.84 g. (0.01 mole) cyanuric chloride is added rapidly and the mixture is stirred for five minutes and 3.5 ml. of a 15% sodium carbonate solution is then added. To the resultant slurry at a pH 3.5, 1.28 g. (0.01 mole) of p-chloroaniline is added and cooling is stopped; 3.5 ml. 15% sodium carbonate solution is then added. The pH is maintained at 5 to 5.5 and the temperature at 5 to 10° C.

When the reaction with p-chloroaniline is complete, 4.0 g. (0.03 mole) 3-(2-hydroxyethylamino)propionamide is added all at once. After four hours the mixture is heated to 95° C. and refluxed for four hours. It is then drowned in isopropanol and the product is filtered and desalted.

The adsorptivity at 350 nm. was 54.1. The product has similar brightening properties to the product of Example II.

EXAMPLE VI

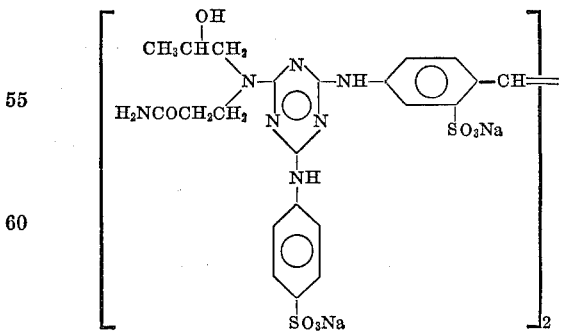

To a slurry of 6.0 g. (0.005 mole) of 86.3% real disodium 4,4'-bis[(4-chloro-6-sulfanilyl-s-triazin-2-yl)amino] stilbene-2,2'-disulfonate in 50 ml. of water, 5.8 g. (0.04 mole) of 3-(2-hydroxypropylamino)propionamide in 25 ml. water is added. It is then heated for 5 hours at 80° C., cooled and drowned in isopropanol and filtered.

The product, 6.7 g., is dissolved in hot 2-methoxyethanol. The solution is then treated with activated charcoal, clarified and drowned in isopropanol. The product is filtered and dried. The absorptivity at 350 nm. is 43.9.

The brightening properties of the product are similar to those of Example III.

EXAMPLE VII

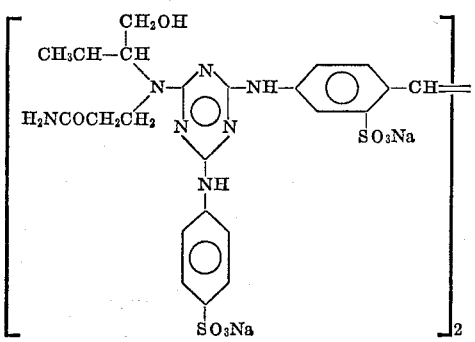

The procedure of Example VI is followed using double the mole quantities. In place of the given propionamide, however, 12.8 g. (0.08 mole) of 3-{[1-(hydroxymethyl)propyl]amino}propionamide is used and 12.5 g. product is obtained. Its absorptivity at 350 nm. is 45.0.

EXAMPLE VIII 3-(2-hydroxyethylamino)propionamide

Acrylamide, 71 grams (1.0 mole) is slowly added to 122 g. (2.0 moles) of ethanolamine dissolved in 200 ml. of ethanol at room temperature. The reaction mixture is stirred for about 16 hours at room temperature. Excess ethanol and ethanolamine are removed by evaporation in vacuo at steam bath temperature. The oily residue slowly crystallizes to a white solid whose structure is confirmed by elemental analysis and NMR as 3-(2-hydroxyethyl) amino propionamide.

When an equimolecular amount of methacrylamide is used, the product formed is 3-(2-hydroxyethylamino)-2-methylacrylamide.

EXAMPLE IX 3-(2-hydroxypropylamino)propionamide

Acrylamide, 71 grams, (1.0 mole) is slowly added to 150 grams, (2.0 moles) of isopropanolamine in 200 ml of ethanol at 15 to 20° C. Following complete addition of the acrylamide the reaction mixture is allowed to sit at room temperature for about 20 hours. The excess isopropanolamine and ethanol are removed by distillation in vacuo. The resulting white, crystalline residue, M.P. 74 to 80° C., is recrystallized from about 1500 ml. of ethyl acetate, affording 126 grams, 86% of theory, of white crystals, M.P. 82.5 to 84.5° C. The structure of the compound is identified by elemental analysis, NMR and IR analysis as 3-(2-hydroxypropylamino)propionamide.

While the present invention has been described herein in terms of specific examples and embodiments thereof, it is not intended that its scope be limited thereby but only as defined in the following claims.

We claim:

1. A compound represented by the formula

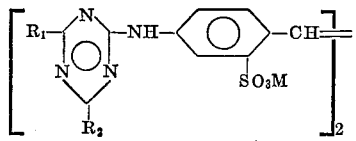

wherein:
$R_1$ is the residue of a 3-[(mono- or dihydroxyalkyl)amino]propionamide in which the 3-amino nitrogen is attached to the triazine nucleus;
$R_2$ is a member selected from the group consisting of lower alkoxy-arylamino and the residue of a 3-[(mono- or dihydroxyalkyl)amino]propionamide in which the 3-amino nitrogen is attached to the triazine nucleus; and
M is a cation selected from the group consisting of hydrogen, sodium, potassium, lithium, ammonium and substituted ammonium.

2. A compound according to claim 1, wherein $R_1$ is the residue of 3-(2-hydroxyethylamino)propionamide.

3. The compound of the formula

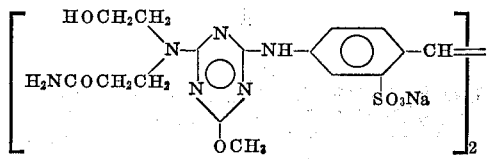

4. The compound of the formula

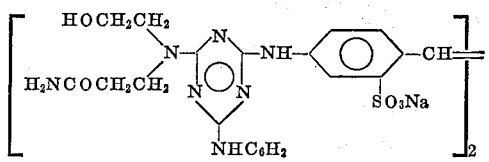

5. The compound of the formula

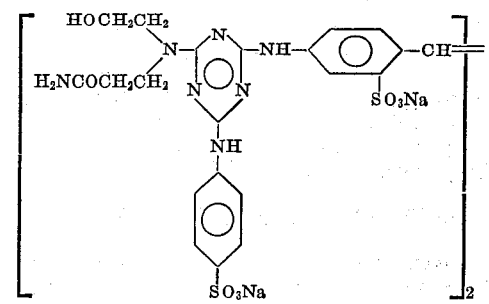

6. The compound of the formula

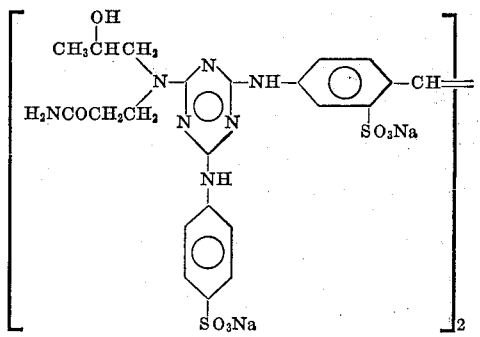

7. The compound of the formula

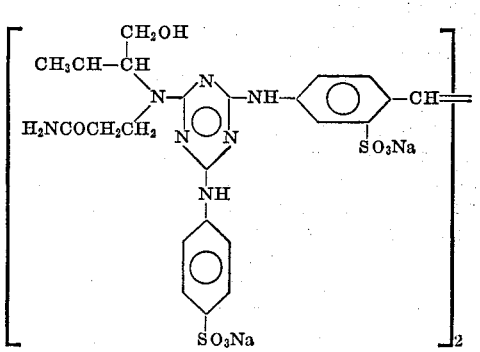

(References on following page)

References Cited

UNITED STATES PATENTS 3,398,143 8/1968 Catino et al. _____ 260—240

FOREIGN PATENTS 92,244 9/1968 France _____ 260—240
 (1st Addition to French Patent 1,128,103)

1,128,103 8/1956 France _____ 260—240
723,006 12/1951 England _____ 260—240

JOHN D. RANDOLPH, Primary Examiner

U.S. Cl. X.R.

117—33.5; 162—162; 252—152, 301.2; 260—561